United States Patent
Reddy et al.

(10) Patent No.: US 7,366,799 B2
(45) Date of Patent: Apr. 29, 2008

(54) DOCUMENT PROCESSING SYSTEM INCLUDING MULTI-DEVICE COMPATIBLE INTERFACE AND RELATED METHODS

(75) Inventors: Paul James Reddy, Auckland (NZ); Berwyn Hoyt, Auckland (NZ); Geoff Shaw, Webster, NY (US); Kevin Pickhardt, Pittsford, NY (US)

(73) Assignee: Pharos Systems International, Inc., Rochester, NY (US)

( * ) Notice: Subject to any disclaimer, the term of this patent is extended or adjusted under 35 U.S.C. 154(b) by 491 days.

(21) Appl. No.: 10/383,152

(22) Filed: Mar. 6, 2003

(65) Prior Publication Data

US 2003/0227643 A1 Dec. 11, 2003

Related U.S. Application Data

(60) Provisional application No. 60/362,209, filed on Mar. 6, 2002.

(51) Int. Cl.
  *G06F 3/00* (2006.01)
  *G06F 15/00* (2006.01)
  *G06F 15/16* (2006.01)

(52) U.S. Cl. .......................... 710/11; 710/15; 710/16; 710/18; 358/1.13; 715/500; 709/227; 399/79; 399/82

(58) Field of Classification Search ............... 715/500; 358/1.13, 1.15; 710/11, 15, 16, 18; 709/227; 399/79, 82
See application file for complete search history.

(56) References Cited

U.S. PATENT DOCUMENTS

| | | | |
|---|---|---|---|
| 3,675,209 A * | 7/1972 | Trost et al. .................... 710/5 |
| 3,828,325 A | 8/1974 | Stafford et al. .......... 340/172.5 |
| 4,167,322 A | 9/1979 | Yano et al. ................. 355/3 R |
| 4,975,829 A * | 12/1990 | Clarey et al. ................. 703/24 |
| 5,084,875 A | 1/1992 | Weinberger et al. ........ 371/291 |
| 5,090,830 A | 2/1992 | Kroeger et al. ............. 400/719 |
| 5,214,772 A | 5/1993 | Weinberger et al. ........ 395/575 |

(Continued)

FOREIGN PATENT DOCUMENTS

EP  0096407  12/1983

(Continued)

OTHER PUBLICATIONS

Clark, Russell J., et al., "Protocol Discovery in Multi-Protocol Networks", Mobile Networks and Applications, Baltzer Science Publishers, vol. 2, © 1997, pp. 271-284.*

(Continued)

*Primary Examiner*—Shahid Alam
*Assistant Examiner*—Robert Stevens
(74) *Attorney, Agent, or Firm*—Allen, Dyer, Doppelt, Milbrath & Gilchrist, P.A.

(57) ABSTRACT

A document processing system may include a document processing device (e.g., a copier), a host (e.g., a computer server), and a multi-device compatible interface for enabling operation of the host and the document processing device from among a plurality of different possible document processing devices. That is, the multi-device compatible interface may determine a set of signals to use with the document processing device upon being connected therewith, and thereafter use the determined set of signals. Accordingly, the multi-device compatible interface may advantageously be used with numerous types of document processing devices despite the differences in their various protocols, connector types, etc.

35 Claims, 2 Drawing Sheets

U.S. PATENT DOCUMENTS

| | | | | |
|---|---|---|---|---|
| 5,235,674 | A * | 8/1993 | Cohen-Skalli et al. | 358/1.1 |
| 5,265,252 | A * | 11/1993 | Rawson et al. | 719/326 |
| 5,333,286 | A | 7/1994 | Weinberger et al. | 395/575 |
| 5,361,265 | A | 11/1994 | Weinberger et al. | 371/29.1 |
| 5,535,371 | A | 7/1996 | Stewart et al. | 395/500 |
| 5,603,060 | A | 2/1997 | Weinberger et al. | 399/8 |
| 5,611,046 | A * | 3/1997 | Russell et al. | 358/1.16 |
| 5,784,664 | A | 7/1998 | Nakamura et al. | 399/8 |
| 5,999,945 | A * | 12/1999 | Lahey et al. | 707/200 |
| 6,009,284 | A | 12/1999 | Weinberger et al. | 399/8 |
| 6,020,973 | A * | 2/2000 | Levine et al. | 358/1.15 |
| 6,148,346 | A * | 11/2000 | Hanson | 719/321 |
| 6,189,050 | B1 * | 2/2001 | Sakarda | 710/18 |
| 6,282,383 | B1 | 8/2001 | Weinberger et al. | 399/8 |
| 6,334,160 | B1 | 12/2001 | Emmert et al. | 710/11 |
| 6,678,750 | B2 * | 1/2004 | Meade et al. | 710/7 |
| 6,775,729 | B1 * | 8/2004 | Matsuo et al. | 710/263 |
| 6,891,887 | B1 * | 5/2005 | Dobson | 375/220 |
| 6,944,867 | B2 * | 9/2005 | Cheston et al. | 719/327 |
| 7,086,001 | B1 * | 8/2006 | Hicks et al. | 715/523 |
| 7,099,023 | B2 * | 8/2006 | Chrisop et al. | 358/1.14 |
| 2002/0004812 | A1 * | 1/2002 | Motoyama | 709/201 |
| 2002/0026546 | A1 | 2/2002 | Yamaguchi | 710/72 |
| 2002/0048462 | A1 | 4/2002 | Weinberger et al. | 399/1 |
| 2002/0078367 | A1 * | 6/2002 | Lang et al. | 713/200 |
| 2002/0116544 | A1 * | 8/2002 | Barnard et al. | 709/324 |
| 2002/0181006 | A1 * | 12/2002 | Chrisop et al. | 358/1.14 |
| 2002/0184356 | A1 * | 12/2002 | Simpson et al. | 709/223 |
| 2003/0037177 | A1 * | 2/2003 | Sutton et al. | 709/316 |
| 2003/0041134 | A1 * | 2/2003 | Sugiyama et al. | 709/223 |
| 2003/0051079 | A1 * | 3/2003 | Kolodziej | 710/17 |
| 2003/0063310 | A1 * | 4/2003 | Nguyen et al. | 358/1.15 |
| 2003/0071117 | A1 * | 4/2003 | Meade, II | 235/382.5 |
| 2003/0090704 | A1 * | 5/2003 | Hansen | 358/1.15 |
| 2003/0126316 | A1 * | 7/2003 | Parker | 710/15 |
| 2004/0192329 | A1 * | 9/2004 | Barbosa et al. | 455/456.1 |
| 2004/0205033 | A1 * | 10/2004 | Simpson | 705/408 |

FOREIGN PATENT DOCUMENTS

| | | |
|---|---|---|
| EP | 0-598-513 A1 * | 10/1993 |
| EP | 0-710-912 A1 * | 10/1995 |
| EP | 0710912 | 5/1996 |

OTHER PUBLICATIONS

*Auto Selective Printer Interface*, IBM Technical Disclosure Bulletin, IBM Corp, New York, NY, vol. 37, No. 2B, Feb. 1, 1994, pp. 295-296.

* cited by examiner

DOCUMENT PROCESSING SYSTEM INCLUDING MULTI-DEVICE COMPATIBLE INTERFACE AND RELATED METHODS

CROSS-REFERENCE TO RELATED APPLICATIONS

This application claims the benefit of U.S. provisional application Ser. No. 60/362,209, filed Mar. 6, 2002, which is hereby incorporated herein in its entirety by reference.

FIELD OF THE INVENTION

The present invention relates to the field of document processing systems, and, more particularly, to document processing device interfaces and related methods.

BACKGROUND OF THE INVENTION

Photocopiers continue to advance in terms of the functionality and flexibility they provide. For example, rather than being stand alone machines as they once were, many copy machines now have digital processing capabilities and network interfaces which allow them to be connected to a computer network. This provides a variety of advantages. Once such advantage is that the copiers may be used as multi-function devices (MFDs) not only for performing traditional photocopying, but also for printing documents generated by computers connected to the network. In the same way, such copiers may also be connected to fax modems for printing faxes.

Moreover, where copiers are connected to a computer network, it becomes possible to collect status and usage information from the computers remotely via a network server or other network terminal. By way of example, one protocol which may be used to monitor and manage copiers is the simple network management protocol (SNMP). An SNMP application running on a server, for example, may use standard (or customized) SNMP queries to poll a copier for certain information such as a current copy count, copier type, status, etc., which may then be used for generating reports or determining which machines may require servicing, for example.

Another particularly advantageous aspect of having networked copiers or multi-function devices is the ability to monitor and account for the usage of such devices. By way of example, Off-The-Glass is a software product from Pharos Systems International, Inc., assignee of the present application, which enables standalone copiers and multi-function devices to be integrated with a network through a network terminal device. This integration enables organizations to authenticate, cost, charge and report on all copying and printing across the enterprise.

Despite their many advantages, there are certain challenges to implementing copiers and/or multi-function devices in a network environment. One such challenge is that printer and copier manufacturers use a variety of different protocols and interfaces for their respective devices. If fact, some manufactures use different interfaces and protocols across their own product line.

As a result, in a large network environment with copiers from numerous manufacturers, it can be cumbersome to interface all of these devices to the network. That is, different interface devices will be required for connecting the various types of copiers/MFDs to the network, which in turn may require numerous device drivers to be installed and maintained on the server. Moreover, while centralized SNMP applications may be able to gather certain limited information from the copiers/MFDs in the network, obtaining more sophisticated accounting or diagnostic information for numerous types of copiers/MFDs across a network may be difficult based upon the lack of uniformity in protocols.

Certain approaches have been taken to address the dissimilarities between the various copier device protocols. By way of example, U.S. Pat. No. 5,333,286 to Weinberger et al. discloses a system for automatically and remotely monitoring the operational status of, and initiating operational commands in, one or more copy machines. Each copy machine has a copier computer therein for determining copier status and controlling operation of the copy machine. The system utilizes a scanner to respectively monitor the copiers which can poll each of the copiers at a uniform rate or, when requested by the user at the central location, vary the poll rate. Furthermore, to accommodate for different copier types, a translator is used to provide a uniform interface between the copier and a central data collection point. In particular, the system allows operation of the copier from the remote location for the diagnosis and correction of detected status problems.

Even though the interface circuitry or translators of such a system provide a uniform interface to the central data collection point, each of these devices will still need to interface with a particular copier type. Accordingly, each of these translators may require individual configuration, or respective types of translators may need to be created for the different copiers being used. Moreover, while the above approach does allow for remote diagnosis of device faults, its capabilities for collecting job attribute information are limited.

SUMMARY OF THE INVENTION

In view of the foregoing background, it is therefore an object of the present invention to provide a document processing system which provides for more ready interconnection of document processing devices to a network and related methods.

This and other objects, features, and advantages in accordance with the present invention are provided by a document processing system which may include a document processing device (e.g., a copier), a host (e.g., a computer server), and a multi-device compatible interface for enabling operation of the host and the document processing device from among a plurality of different possible document processing devices. That is, the multi-device compatible interface may determine a set of signals to use with the document processing device upon being connected therewith, and thereafter use the determined set of signals. Accordingly, the multi-device compatible interface may advantageously be used with numerous types of document processing devices despite the differences in their various protocols, connector types, etc.

More particularly, an adapter may also be included for connecting the multi-compatible interface device to the document processing device. The adapter may include an identification circuit for identifying the set of signals to be used with the document processing device upon being connected to the multi-device compatible interface. For example, the adapter may include a cable assembly with the appropriate connector for the type of port on the document processing device, and the identification circuit may be an integrated circuit carried by the cable assembly.

Alternately, the multi-device compatible interface may determine the set of signals to use with the document processing device based upon a protocol used by the document processing device. By way of example, the multi-device compatible interface may look to a particular timing of the protocol which is unique to a given document processing device type. Another protocol attribute may be the signal levels used by the document processing device. In particular, the particular signal levels used by the document processing device may be compared with a plurality of signal level patterns or "fingerprints" for known device types to determine the signal set appropriate for the document processing device.

Additionally, the document processing device may include a communications port, and the multi-device compatible interface may be connected to the communications port. Further, the multi-device compatible interface may advantageously determine the set of signals to use with the document processing device based upon a configuration of the communications port, e.g., by the number or configuration of pins/contacts of the communications port, etc.

The multi-device compatible interface may also compare at least one signal generated by the document processing device with at least one threshold to detect a fault condition of the document processing device based thereon. By way of example, the multi-device compatible interface may monitor a signal used for setting the darkness of a job to determine whether selected levels are repeatedly above a normal darkness threshold, which may indicate that the document processing device has a toner throughput problem.

The multi-device compatible interface may also advantageously generate job accounting data based upon jobs performed by the document processing device. For example, the job accounting data may include such information as a number of pages processed, page sorting, paper size, stapling, binding, double-sided processing, color processing, etc. In addition, the document processing system may also include a personal area network (PAN) device for collecting the job accounting data from the multi-device compatible interface. This may be particularly useful when the host is not otherwise available and the multi-device compatible interface cannot transmit this data directly to the host, for example Furthermore, the multi-device communication interface may generate simple network management protocol (SNMP) data for the host. Moreover, the multi-device compatible interface may include a wired network port and a wireless network port for communications with the host, and the multi-device compatible interface may determine which of the wired and wireless network ports is available for communicating with the host and uses the available port thereafter.

Another advantageous aspect of the invention is for a multi-device compatible interface for enabling operation of a host and a document processing device from among a plurality of different possible document processing devices, such as the one described briefly above. More particularly, the multi-device compatible interface may include an interface connector to be connected to the document processing device, and a microprocessor connected to the interface connector for determining the set of signals to use with the document processing device upon being connected therewith, and thereafter using the determined set of signals.

A method aspect of the invention is for enabling operation of a host and a document processing device from among a plurality of different possible document processing devices. The method may include connecting a multi-device compatible interface between the host and the document processing device, and determining a set of signals to use with the document processing device using the multi-device compatible interface upon connection with the document processing device. The method may also include using the determined set of signals for operation of the host and document processing device thereafter.

DETAILED DESCRIPTION OF THE PREFERRED EMBODIMENTS

Figure 1:
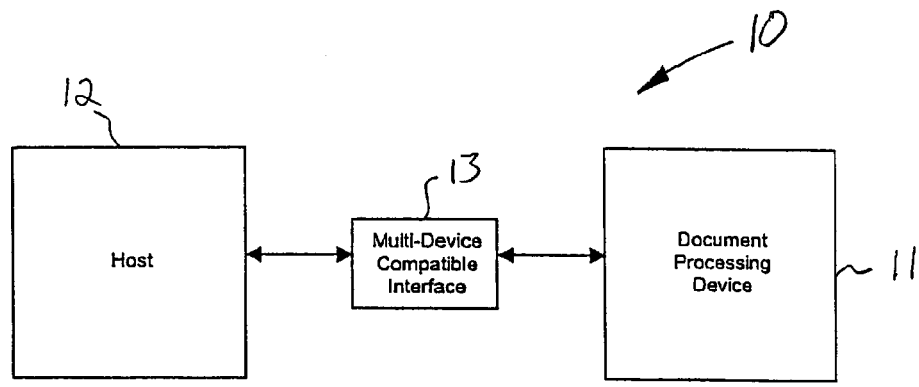
FIG. 1 is a schematic block diagram of a document processing system in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Prior to describing the present invention in further detail, it will first be helpful to define various terms that will be used throughout the following discussion. For example, "document processing device" includes any device that produces photocopies or reproductions or transfers information from one media to another, such as photocopiers, printers, fax machines, scanners, multi-function devices (MFDS) which perform more than one of these functions, etc. A "personal area network (PAN)" is a memory device which may be periodically carried by a person between equipment to transfer data, as will be appreciated by those skilled in the art.

Furthermore, a "token" is a device suitable for being carried by a user that is able to store user profiles, job quantities, and tracking or project codes, for example. A hand-held computer may also be used as a token. Tokens may be used to allow a user or users access to the copier or network database system (e.g., a server database), to provide profiling information (e.g., user preferences) to the copier, to gather profiling information for use by a backend database system, or to transfer setup information to the multi-device compatible interface. Tokens may also be simultaneously used as a PAN memory device. "Tracking" refers to the recording of information which may trigger an action or activity, i.e., the information may cause execution of a rule directive.

A "backend database" refers to a database and reporting system which may be implemented on a host or network server for storing tracked data, users, projects, decision tables, etc. An exemplary backend database system is implemented in the Uniprint and Corporate software applications from Pharos International, Inc., assignee of the present application. Additionally, an "expansion port" refers to a hardware port to which any number of hardware devices may be linked, such as card readers, Bluetooth or 802.11 devices, etc. "Sensors" refers to electrical signal monitors that may be placed at various places inside the document processing device to determine what it is doing.

A "fax line observation device" (FLOD) can listen in to a fax "conversation" and read the phone number, company name, and other details which are normally printed at the top of a fax, for example. A "foreign device interface" (FDI) is a port on most copiers which outputs one count each time a copy is made, and has an input allowing the copier to be enabled or disabled. Other features are sometimes available via FDI ports as well.

"Status observation by active keyword searching" (SOAKS) is used to obtain information from a document processing device's diagnostic port, status data port, or network port. The data stream is searched for known patterns (data sequences). When found, these patterns cause a predetermined action. For example, this action may set a flag indicating the copier's new status. Known patterns may be updated at any time to add or remove patterns. The purpose of SOAKS is to detect status from a data stream involving an unknown protocol without having to support the protocol, but merely update a set of patterns, as will be discussed further below.

"Simple network management protocol" (SNMP) is a protocol known in the art to monitor and manage devices such as a copier through an appropriate copier port (e.g., Ethernet port). "Copier management protocol" (CMP) refers to a set of one or more protocols used to obtain information from a copier or send information or instructions to a copier. CMP may include SNMP, SOAKS, proprietary protocols, or a combination thereof. CMP protocols may be used through any port available at the copier including proprietary ports with diagnostic or meter-reading capability.

"Display observation technology" (DOT) is used to obtain information from the display of a document processing device (e.g., a copier display). The display data is intercepted, and optical character and symbol recognition may be used on the data together with a list of known text or symbol sequences (strings). These sequences can reveal information about what the copier is doing (e.g., faults, paper sizes, etc.), as will be discussed further below.

Additionally, "downloadable code" refers to a mechanism by which all or part of the system's firmware may be updated remotely from a central source (e.g., a server) over a network. Similarly, "download third party code" refers to a mechanism by which all or part of the document processing device's code may be updated remotely from a central source, according to the make and model of copier.

Referring now to FIG. 1, a document processing system in accordance with the present invention illustratively includes a document processing device 11 and a host 12. By way of example, the host 12 may be a computer server, and the host 12 and document processing device 11 are preferably connected together in a computer network, such as a local area network (LAN). Such a network may include other document processing devices connected to the host 12 as well, in addition to computer workstations (e.g., PCs, etc.) for sending print jobs to the document processing devices, as will be appreciated by those skilled in the art.

In accordance with the invention, the document processing system also includes a multi-device compatible interface 13 illustratively connected between the document processing device 11 and the host 12. The multi-device compatible interface 13 is for enabling operation of the host and the document processing device 11 from among a plurality of different possible document processing devices. The multi-device compatible interface 13 may advantageously be used with numerous copier types/protocols because it determines the particular set of signals to use with the document processing device upon being connected therewith. Thereafter, the multi-device compatible interface 13 uses the determined set of signals.

More particularly, a variety of different types of copiers are produced by several manufacturers. Not only do the various connectors and communication protocols for these various copiers vary widely from one manufacturer to the next, but they may also vary among a single manufacturer's own copiers. Thus, to connect a number of different types of copiers to a network would ordinarily require a separate interface device for each copier type. That is, each interface device may not only require the appropriate connections for the given ports on a specific copier, but it would also need to operate in accordance with the particular set of signals defined by the manufacturer for the copier.

Figure 2:
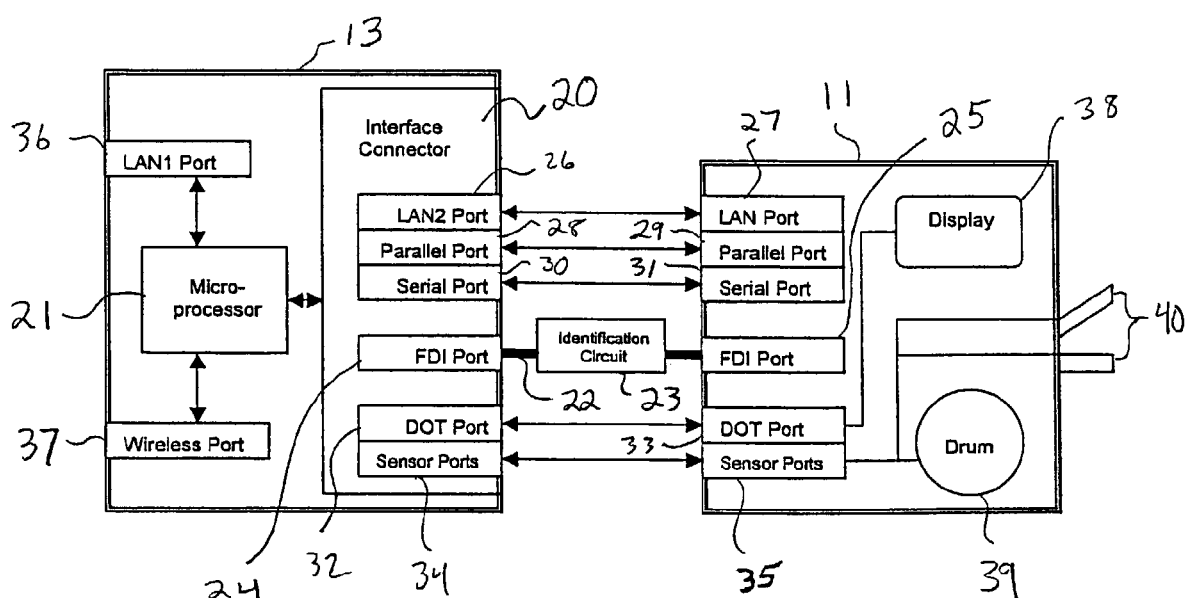
FIG. 2 is schematic block diagram illustrating the multi-device compatible interface and document processing device of the document processing system of FIG. 1 in further detail.

The way in which the multi-device compatible interface 13 determines the set of signals to use with the document processing device 11 will now be described with reference to FIG. 2. As illustratively shown, the multi-device compatible interface 13 includes an interface connector 20 which includes the requisite ports and interface circuitry for interfacing with the document processing device 11, as will be appreciated by those of skill in the art. The multi-device compatible interface 13 further includes a microprocessor 21 connected to the interface connector 20 for performing various functions which will be described further below.

In accordance with one embodiment, the document processing system 10 further includes an adapter for connecting the multi-device compatible interface 13 to the document processing device 11. In the illustrated example, the adapter includes a cable assembly 20 and an identification circuit 21 carried by the cable assembly. The adapter may be connected between FDI ports 24, 25 of the multi-device compatible interface 13 and document processing device 11, respectively, for example, as illustratively shown.

The multi-device compatible interface 13 and document processing device 11 may also include one or more of respective LAN (e.g., Ethernet) ports 26, 27, parallel ports 28, 29, serial ports 30, 31, DOT ports 32, 33, and/or sensor ports 34, 35, as will be appreciated by those of skill in the art. In some embodiments, the adapter may be used for connecting respective pairs of these ports instead of the FDI ports 24, 25.

The integrated circuit 21 may be an integrated circuit, for example, which includes memory (not shown) for storing data identifying the type of document processing device 11 the multi-device compatible interface 13 is being connected to. Of course, other suitable identification circuits may also be used, as will be appreciated by those skilled in the art. During installation of the multi-device compatible interface 13, the appropriate cable will be selected for the document processing device 11 depending on its manufacturer and FDI port 25 type, for example.

Once plugged into the multi-device compatible interface 13, the multi-device compatible interface 13 identifies the set of signals to be used with the document processing device 11 based upon the information previously stored in the identification circuit. Thus, in accordance with this embodiment, only the adapter need be customized for the given document processing device 11, while the multi-device compatible interface 13 may advantageously be used with numerous types of document processing devices.

In accordance with another advantageous embodiment of the invention, the multi-device compatible interface 13 may determine the set of signals to use with the document processing device 11 based upon a particular protocol used by the document processing device. That is, the given communications protocol used by the particular document processing device 11 will necessarily have certain distinctive characteristics that can be used to identify the protocol. By way of example, one such characteristic is the cable/plug combinations or connector configurations (e.g., number or arrangement of pins/contacts) required to connect to the document processing device 11.

Furthermore, the multi-device compatible interface 13 may look to a particular timing of the protocol which is unique to the document processing device 11 type. Another protocol attribute may be the signal levels used by the document processing device 11. In particular, the particular signal levels used by the document processing device may be compared with a plurality of signal level patterns or "fingerprints" for known device types to determine the signal set appropriate for the document processing device 11. Of course, it should be noted that the connection between the multi-device compatible interface 13 and the document processing device 11 could take many forms, such as a fiber-optic link, wireless radio-frequency (RF) link, infrared (IR) link, or other suitable communications link, for example.

These signal level patterns could be downloaded to the multi-device compatible interface 13 prior to installation, or when the multi-device compatible interface is connected to the host 12. If CMP is implemented in the document processing device 11, the multi-device compatible interface 13 may potentially use CMP commands in some embodiments to determine the requisite signal set as well, as will be appreciated by those of skill in the art.

Moreover, the multi-device compatible interface 13 also illustratively includes a wired (e.g., metal, fiber-optic, etc.) network port 36 (e.g., an Ethernet port) and a wireless (e.g., RF, IR, etc.) network port 37 for communications with the host. By way of example, the wireless port 37 may be used for facilitating wireless communications in accordance with the Bluetooth or 802.11 wireless network protocols, for example, and the multi-device compatible interface 13 may include (or be connected to) additional circuitry as necessary for the given wireless protocol used (e.g., transceiver, antenna, etc.).

The multi-device compatible interface 13 preferably determines which of the wired and wireless network ports is available for communicating with the host 12 and uses the available port thereafter. That is, the multi-device compatible interface 13 may automatically detect which network path is being used for the particular installation. By way of example, in the case of a wired Ethernet connection (e.g., TCP/IP), a set of host IP address/port combinations may be used which the host 12 will respond to. For a wireless network connection, a simple broadcast message may be built in to the multi-device compatible interface 13 so that it can be located by the host 12. Of course, it should be noted that both wired and wireless network connection need not be used in every embodiment, or both may be used simultaneously, as will be discussed further below.

It should also be noted that if multiple sockets are available for one plug, the multi-device compatible interface 13 may auto-detect which socket it is plugged into in some embodiments. Moreover, if this is impossible because a given copier, etc. has too many similar plugs, the multi-device compatible interface 13 may act to prevent damage from occurring when plugged into the wrong place, such as by powering down or other appropriate measure, etc., as will be appreciated by those of skill in the art.

Another advantageous aspect of the invention is that the multi-device compatible interface 13 may advantageously perform fault tracking, if desired. By way of example, the multi-device compatible interface 13 may compare signals generated by the document processing device 11 with one or more thresholds to detect a fault condition of the document processing device based thereon.

By way of example, the multi-device compatible interface 13 could monitor a signal used for setting the darkness of print/copy jobs to determine whether selected levels are repeatedly above a normal darkness threshold, as this would indicate that the document processing device has a toner throughput problem, for example. Other faults may also be detected based upon extreme or unusual settings gleaned from monitoring signals from the document processing device 11, as will be appreciated by those skilled in the art. This may be done using CMP, SOAKS, and/or DOT, for example.

Moreover, as noted above, the interface connector 20 may also include one or more ports 34 for connecting to various sensors in the document processing device 11, such as sensors for a printing drum 39 and/or paper input trays 40, for example, as illustratively shown. The multi-device compatible interface 13 may thus detect and (optionally) log copier, printer or reproduction, etc. faults gleaned from these sensors in this way as well.

By way of example, information which may be recorded regarding faults includes the date/time the fault occurred and when it was corrected, the type of fault (e.g., out of paper/toner, paper jam (and where the jam occurred), overheating, etc.), and whether the fault was fixed by a user or serviceman. This could be determined by requiring a serviceman to identify himself. The document processing device 11 may then enter a service mode where the serviceman may be able to make test copies.

In some embodiments, it may be desirable to count faulty copies in a separate category from good copies so that user can be discounted for faulty copies. Faults may also be tracked based upon other parameters. Other fault indicators may include users repeatedly identifying themselves and then quitting without making copies (an unusual behavior), by jobs which are rejected, by a FLOD 53 (FIG. 3) as jobs fail, etc.

In addition, in some embodiments it may also be desirable to detect faults (or other attributes) by intercepting data (e.g., serial data) from a display 38 of the document processing device 11. This may be done, for example, using character recognition on graphical data, as well as auto-detection of port pin-outs (even if device-dependent), baud rate, and protocol, as will be appreciated by those skilled in the art. Remote detection and addition of new symbols for symbol-recognition may also be performed in cooperation with the host 12, for example.

In accordance with another advantageous aspect of the invention, the multi-device compatible interface 13 may also track and monitor job information and generate job accounting data based upon jobs performed by the document processing device. That is, all jobs performed by the document processing device 11 may be tracked and monitored, which may include copies, reproductions, or creations made from a captured image (e.g. scanning or photographing) or through the document feeder. Print and fax jobs may also be tracked. In particular, fax job information may be tracked whether incoming or outgoing, including the source and destination phone numbers, company name, etc. Scanned jobs may also be tracked.

Depending upon the given type of job, the tracked information may include: the user doing the job; the copier doing the job; the system doing the job (i.e., the equipment type of the job's source, or the components involved in the job's distribution and production); attributes of the document processing device 11 (e.g., geographic location, device identification (ID) and type); date/time of job; number of pages, impressions or creations per document; number of copies of document; copying attributes including whether sorting is on, which bin is sourcing the paper, paper size, stapling/ binding options, double-sided printing; origin of the job (copier glass, incoming fax, or network print); destination of job (e.g., sorter for copying, Ethernet for scanning, etc.); whether a copy, reproduction or creation has color; the fraction of color production of the media coverage; and/or the fraction of black and white coverage of the media covered.

The multi-device compatible interface 13 may log as much information as possible according to the following techniques. The date/time may be logged according to a multi-device compatible interface 13 internal clock (not shown). This clock may include a battery backup for when a power outage occurs while the network is down, for example. Moreover, the number of total pages may be obtained: for copied pages made off the glass via the FDI or CMP; for printed pages via a server print management program, such as Pharos Uniprint/Corporate; and for faxed pages via a sensor, the FLOD 53, or CMP/DOT.

As briefly discussed above, DOT observation works by intercepting the data from the wires attached to the display 38 (e.g., serial wires). Character/symbol recognition may be used if the data is graphical. The data may then be searched for known, meaningful sequences (e.g., words). This method may potentially be the most generic, reliable and easy-to-install way to find faults and attributes. Of course, auto-detection of serial pin-out, baud rate and protocol may also be used, as will be appreciated by those of skill in the art. Remote detection and the addition of new symbols for symbol-recognition (used for copy attributes) may also be included, as discussed above.

Information regarding scanned pages may be obtained from a sensor or CMP/DOT/SOAKS. Similarly, the number of pages per document (or number of copies of document) may be obtained from a sensor in the document feeder, or from the CMP/DOT/SOAKS. Copy attributes (e.g., binding, stapling, duplex, etc.) may be obtained from sensors throughout the copier, or from the CMP/DOT. The origin of the document (glass, fax, Ethernet, printer port, etc.) may be obtained from CMP/DOT/SOAKS, from sensors throughout the copier, and/or by a process of elimination.

Destination (fax, Ethernet, output tray, etc.) of the job may be obtained from the CMP/DOT/SOAKS (may have limited info on fax and Ethernet destinations), from sensors throughout the copier, and/or by a process of elimination. Various detection methods may be used, such as using CMP to detect tray output, or the FLOD 53 can detect outgoing faxes, phone number, company name, etc. If the source is not one of those noted above, a standard firewall may be used in certain embodiments to determine its whereabouts, for example, as will be appreciated by those skilled in the art.

It should be noted that the multi-device compatible interface 13 may advantageously operate where no pre-existing wired network is present. In such case, the various reports/ job accounting data discussed above may be collected via the wireless port 37, for example, or by a hand-held data collection device, such as a PAN. The PAN may communicate with the multi-device compatible interface 13 via an infra-red/Bluetooth expansion card 51 (FIG. 3), for example, or otherwise.

Of course, such a hand-held device may be used even if a wired network is present. That is, when the host 12 is not otherwise available (due to server outage, etc.), the multi-device compatible interface 13 will not be able to transmit this data directly to the host. In accordance with the invention, the multi-device compatible interface 13 may operate in a standalone mode, during which it may interface with a PAN to allow for continued data collection, as will be appreciated by those skilled in the art. Of course, other data collection devices may also be used, such as handheld computers, for example, or even "unintelligent" memory, as will be understood by those skilled in the art.

By way of example, when no wired network is present or the host 12 is otherwise unavailable, a user or supervisor may carry a Bluetooth-enabled (or other) memory device past all the copiers in a network or environment once a day or so. The multi-device compatible interface 13 preferably detects the host 12 outage and switches to the standalone mode automatically based thereon. When in standalone mode, the multi-device compatible interface 13 may perform one or more of the following features: all tracking, fault tracking, and project tracking takes place as normal, and is stored for later collection; users may be identified; tokens may be authenticated; and payment by smartcard or token may be processed. Payment by credit card may be processed without immediate authentication, but this may be undesirable as some cards may be invalid.

Other standalone mode features include: copier enabling/ disabling; blocking of jobs from unauthorized sources; rule based decisions may operate according to latest rule table update, although rules requiring online information will preferably take their default action; remotely upgrading copier features (upgradeable at next network link); local, interactive debugging; integration with other software; adequate data collection for full reporting features; smart local installation (e.g., using a laptop computer attached to the multi-device compatible interface 13 at install to download drivers). Other features may be added before product release or after release by a code download, for example.

Conversely, it may be advantageous to disable certain features when in the standalone mode. By way of example, such features may include: payment by online account; payment by debit card; print job forwarding; remotely upgrading copier features; remote, interactive debugging; reporting of statistics which are normally available at the copier terminal such as copy totals since last bill, etc.

The PAN device may be used to transfer data so that most features will operate in the standalone mode, although they will have a time lag. To this end, tracked data may be collected as normal, and stored in a transmission buffer (not shown) until the next time the PAN device circulates, or a network link is restored. Remotely upgradeable features (downloadable code, etc.) may work through the PAN as well, and data exchanges with other network software may also be facilitated via the PAN device.

To address the problem of using credit cards during a standalone mode, credit cards may be authenticated against a hot-list of invalid cards stored at the multi-device compatible interface 13, for example, in some embodiments if desired. Also, rules may also be stored at the multi-device compatible interface 13 defining criteria which are only available online. For example, a rule which only allows over 100 copies if there is no high volume copier nearby may be set to allow any amount of pages to be copied since it cannot determine whether a high volume copier is nearby without network connectivity.

Smart installation of standalone devices may be performed using a laptop, etc. The laptop may store device drivers and smart detection algorithms which would be transferred over a network if one were available, as will be appreciated by those of skill in the art.

It should be noted that the multi-device compatible interface 13 may advantageously be used with numerous types of networks as well. Data transfer may be made secure from monitoring and tampering through encryption, etc., if desired, as will be appreciated by those skilled in the art. Also, since the multi-device compatible interface 13 is connected between the document processing device 11 and the host 12, it may perform the functionality of an Ethernet (or other) network hub, a data switch, or router, as will be appreciated by those of skill in the art. The network used may include a number of different kinds of radios and protocols, as well as wire or fiber optic networks. Data compression may also be implemented in some network applications, for example.

To work with slow networks, such as two-way-paging systems (9600 baud, 10 seconds typical network lag, etc.), and expensive networks which are charged per byte, the multi-device compatible interface 13 may provide the following features. For example, it may transfer data and commands in their minimum state (e.g. binary format), maintain minimal code size so that downloads are small, and/or perform minimal functionality so that downloads are infrequent.

It should also be noted that the multi-device compatible interface 13 is not only well suited for newer digital document processing devices, but it is also particularly well suited for use with older analog machines as well, such as analog copiers. That is, such copiers would normally not have the ability to be connected to a network. However, the multi-device compatible interface 13 could be used with such analog copiers to provide an interface to a network, as will be appreciated by those of skill in the art. More particularly, the multi-device compatible interface 13 may respond to standard SNMP commands, and generate SNMP data for an SNMP control application running on the host 12, for example.

Various other advantageous features of the multi-device compatible interface 13 will now be further described. One such feature is that the multi-device compatible interface 13 may provide position tracking for its associated document processing device 11. For example, the multi-device compatible interface 13 may track the location of the document processing device 11 relative to building landmarks. It may also detect and track the global position of the copier using the global positioning system (GPS), as will be appreciated by those skilled in the art. Such position tracking will advantageously allow detection of when the document processing device 11 is moved so that the location relative to building landmarks can be flagged as requiring and update, or an alert may be raised.

The multi-device compatible interface 13 may also perform project tracking. That is, single or multiple-level project, financial, department, tracking or other codes may be used to track jobs. Such codes may be entered at a terminal connected to the multi-device compatible interface 13 or otherwise, such as by a token. By way of example, a level one code may choose the department (a lawyer may use code seventeen for legal), and a level two code may specify a client (e.g., use code 321 for client A). By way of example, Pharos Uniprint/Corporate may manage setup and reporting of the codes.

The multi-device compatible interface 13 is able to track jobs without identifying the user. However, the user may be identified or authenticated, if desired for a given application. The user's identity may be used by the client for statistics, tracking, controlling, monitoring and/or billing purposes. By way of example, this identity may be gained by several methods, such as: a simple ID and PIN number; a barcode; a token or swipe card; or a biometric sensor like a thumbprint reader.

Some of these identifiers (e.g., memory card) may require source authentication. In other words, only certain people should be able to change the ID of a memory card. This may be done by storing a public key digital signature on the memory card. The digital signature may preferably be produced only by Pharos or other secure software applications, where the private key is known to only the software. Once the user is identified, his ID may be used in rule processing and logged against any job he performs. Maintenance of user ID's, and putting them onto ID cards or devices may be handled externally to the multi-device compatible interface 13.

In certain networks or environments, copiers may be organized into logical groups of various levels. Users of one group may be restricted from using copiers in a different group depending on use permissions or access rights, for example. Each user is assigned a set of access levels. For example, a member of the executive group may have access to any of the company copiers worldwide, and administrative group member may only have access to local copiers, and a member of the apprentice group may only have permission to do black and white copying.

By way of example, a copier lease authority may lease and service copiers for a library and a city council. Using a combination of multiple level groups and access levels, a group of copiers may be created for the library, and a separate group for the city council. Each of these groups is marked to provide standard user access levels. A higher-level service group may be created which includes all of the copiers in previous groups. This group is marked to provide serviceman access. This will prevent library users from using city council copiers. Neither may the city council use library copiers. Yet, servicemen can use any of the copiers, and reporting of all the copiers may go to a host at the copier lease authority.

Which users have what access to what groups of copiers may be handled by the backend database. The backend database may determine which user has what access to a copier, and send user/access information to the copier's interface device. In such case, the multi-device compatible interface 13 is simply told which user ID has what access levels. By way of example, when a user is identified, a request is sent over the network to the backend database system at the host 12. The database system may look up the user's access levels and the copier's group to determine what access the user has and send that information to the multi-device compatible interface 13.

A cache of potentially thousands (or more) of users and their access levels may be stored in each document processing device 11 (or multi-device compatible interface 13) for instant access. The cache may be updated whenever the access levels and grouping table change in the database. The cache may be used exclusively in the event of network outage and for standalone devices. Actions taken based on a user's access levels may be implemented by use of the rule-based decision engine, as will be discussed further below.

As briefly noted above, jobs may be tracked by tokens carried by the user. Tokens may be programmed with user identification, user preferences (profiles), project codes, and allowed quantities, for example. This programming may be done from a PC using as follows. A hardware device may be used to connect the PC's serial port to the token. Then, a PC application is used to run the hardware device and program the token. This application may link to the backend database, for example.

By way of example, a user may have a token including his identity. Prior to copying, he may get administration to enable his token for a specific job. Administration may program his token with the appropriate project codes, and allow the user a maximum quantity for that job. When the user performs the job, it may be tracked against those project codes. When he reaches the maximum quantity, the copier may disallow further copies until the token is refreshed.

A department may be given several limitless tokens, such as one for each project. The appropriate token is used for the project, and jobs may be tracked against that project's codes. Further, the token may retain copier settings for that project, e.g., default to A4 paper and choose photo quality. When a token is presented, the multi-device compatible interface 13 may not require any further user ID or project information, for example.

Where payment is required for use of the document processing device 11, local payment at the document processing device may be implemented in accordance with the present invention. Various payment methods may be used, such as online accounts, third party online accounts, credit/debit cards, smartcard (or token), and/or cash. Payment by online account may be made through Pharos Uniprint/Corporate or other suitable applications, and debit card payment may be authenticated in real time. Credit card payment may be authenticated online if possible. Otherwise the card may be checked against a hot-list of invalid cards, as noted above. This list is preferably updated as often as possible (e.g. every day). Further, smartcard and token payment may be immediately deducted from the card/token by the card/token reader or writer.

Another important feature of the multi-device compatible interface 13 is its ability to disable or enable the copier, as noted above, which may be done through the FDI or CMP, for example. This may be performed based upon on the user, authorization details, the time of day, or any other rule. In some embodiments, specific copier features may be enabled or disabled, as noted above.

Figure 3:
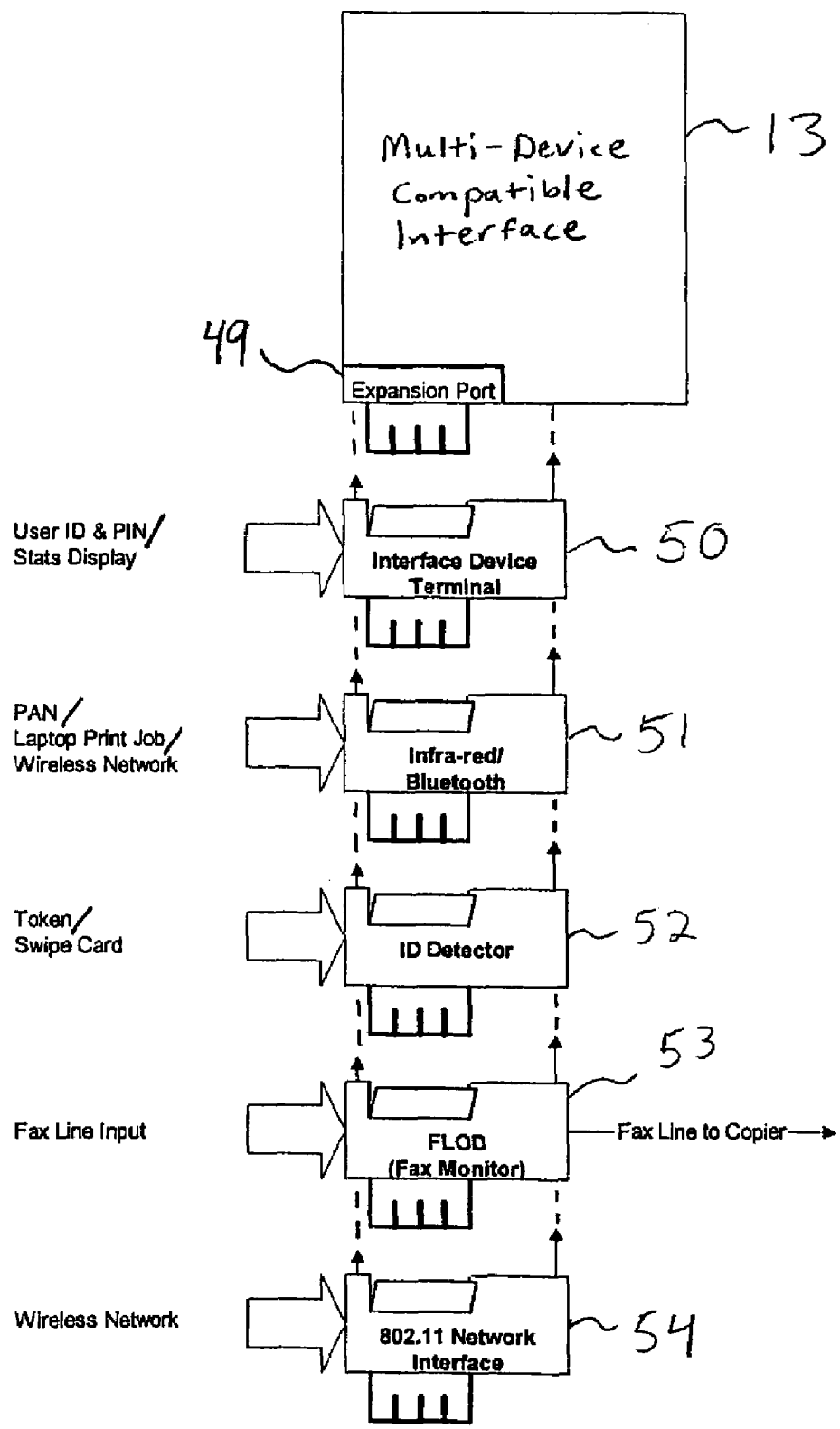
FIG. 3 is a schematic block diagram of the multi-device compatible interface of the document processing system of FIG. 1 illustrating the use of expansion cards therewith.

As illustrated in FIG. 3, jobs may be printed to a wireless (e.g., infrared or Bluetooth) hardware device (e.g., an expansion card) 51 attached to the multi-device compatible interface 13. These jobs are preferably received in a language appropriate to the document processing device 11 (e.g., PCL or postscript). They may be routed to the document processing device 11 (e.g., via its Ethernet port) without changing the actual data (only the protocol layer). This routing may work by the multi-device compatible interface 13 decoding the wireless protocol used to transmit the print job, and then encoding the job in a TCP/IP protocol, or as required by a standard parallel printer port.

It should be noted that other types of hardware/expansion cards may also advantageously be connected to the multi-device compatible interface 13 via an expansion port 49 thereon. By way of example, these may include: an interface terminal device 50 for receiving user ID/PIN and status information; an ID detector 52 for reading a token/swipe card; the FLOD 53 noted above; and an 802.11 network interface device 54 for providing a wireless network communications link (this later device could instead be connected to the dedicated wireless port 37 in some embodiments). With respect to the FLOD 53, the fax line may be routed through the microprocessor 21 and/or a switch in the multi-device compatible interface 13 and may be disconnected when an invalid source is detected.

Jobs sent to unauthorized sources may be blocked by the multi-device compatible interface 13 in certain embodiments. With respect to Ethernet-based jobs, the jobs may be routed through the microprocessor 21 on the multi-device compatible interface 13. Unauthorized sources may be ignored or create an error log. In other words, only valid jobs will be passed through to the document processing device 11. Wireless jobs may similarly be routed through the multi-device compatible interface 13 and blocked if the wrong user tries to print.

As briefly noted above, the multi-device compatible interface 13 may also perform various remotely upgradeable copier features. This may be done using a download third party code mechanism. Furthermore, the multi-device compatible interface 13 may retain a fixed segment of code which cannot be changed. This fixed segment is adequate to download the rest of the code needed (device protocols/fingerprints, etc.) all at once or in parts.

In accordance with one particular embodiment, the multi-device compatible interface 13 may retain two base memory segments for holding two sets of base code. The base code in one segment may be running while updated base code is downloaded into the other base segment. When downloading is finished, the new base code may be run. Other non-base code segments may be downloaded later as described above. Further, an efficiency gain on either of the above described methods may be to use differential download (downloading a list of changes rather than new code), or data compression, or both. Such data transfer may be accomplished using CMP protocol, for example.

The multi-device compatible interface 13 may also implement a rule-based decision engine. More particularly, each copier may be operated in accordance with a particular a set of rules. By way of example, if a user has reached his weekly quota of copies, the copier may be disabled for that user. Also, if someone is trying to make too many copies on a low volume copier, he is told to move to a higher-volume machine. Another rule may be if it is a weekend, then color copying is disabled. Further, the user may be warned of low credit at a certain threshold.

A rule table may be downloaded to the multi-device compatible interface 13 whenever an update is required. The rules in the rule table may include certain criteria and actions. Every time one of the rule criteria changes, the rule table may be searched to check for valid actions. By way of example, user X may be part of group Y. The user presents his token so that he can be identified by the multi-device compatible interface 13. Since the user ID and group ID are criteria of the rule table, it is searched. For such case, an exemplary rule table may include the following: (a) if user is in group Y, enable the copier for black and white copies; and (b) if the user is in group Z, enable the copier for both black and white and color. Thus, in the present example, the user is allowed to do only black and white copying.

The multi-device compatible interface 13 may be used to deal with faults in various ways. It should be noted that network redundancy may minimize network outage (e.g. two networks may be present, and when one fails, the other will be used). Network redundancy may be achieved in various ways. One option is to provide two networks, e.g., a wireless network and an Ethernet network, and connect the multi-device compatible interface 13 to both via the wired and wireless ports 36, 37. Another option is to provide multiple network routes to multiple servers. Network outage may cause the device to switch to standalone mode, as noted above. The multi-device compatible interface 13 may also report the network faults to the PAN, etc., if desired.

The multi-device compatible interface 13 may perform copier load and fault management as follows. Copier faults may be reported through the network to the host 12. Copier faults are preferably reported as soon as possible to the host 12, which can decide how to process the fault (e.g., page a serviceman, which may be done through the backend database). Also, a job may be rerouted to another document processing device if the document processing device 11 is in a fault or overloaded state.

While the document processing device 11 is in a fault state, or if a user identifies himself while someone else is using the document processing device, an attached terminal may display a list of other copiers available to the client, and their capabilities, in some applications. A display (e.g., a scrolling display) may be connected to the interface device terminal 50 for this purpose, for example. Of course, any user activity requiring the display may take precedence over the display of alternate copiers, if desired.

The multi-device compatible interface 13 also provides many advantageous enhancement and debugging features. For example, the multi-device compatible interface 13 may provide remote, transparent (to the user), and automatic updates and bug fixes. The system 10 may allow for downloadable code for bug fixes, enhancements and new features, initiated and controlled from either the host 12 or multi-device compatible interface 13. Further, remote, interactive debug with full, programming level control may also be implemented, as will be appreciated by those skilled in the art.

Software enhancements and bug fixes may take place using the code download mechanism. This may be transparent to the user and may be transparent to the client if desired. Bug investigations and fixes may take place remotely using a full-control debug commands provided for this purpose. These commands may include various levels of safety. For example, level one commands may offer full control with associated crash danger, while level two commands may offer limited control but are nonetheless safe.

Moreover, a local debugging interface may be provided (e.g., via the interface terminal device 50). Local interactive debugging will essentially be the same as the remote debugging, just performed through the local terminal. A local-access to the above debug commands may be available through the local terminal as well.

It should also be noted that the multi-device compatible interface 13 advantageously provides for integration with the Pharos Uniprint/Corporate products or other suitable software. The format of data exchange is such that it may preferably be converted for use with Uniprint/Corporate as well.

Exemplary reporting features of the multi-device compatible interface 13 will now be further described. Reports may be generated, for example, by associated Pharos Uniprint and Corporate systems (or other suitable software). These may be available to either the organization possessing the document processing devices, or to a central authority, or to both, depending on the setup.

The multi-device compatible interface 13 may also collect adequate information for generating the following reports: volume (total, per copier, or per group of copiers); faults (total, per copier, or per group of copiers); trend analysis (of volume and faults); user usage (e.g., low/high volume users); group usage; usage categorized by project; cost per copier since a date or since last billing date. Some statistics may also be accessible to a user or serviceman at a terminal attached to the via interface device terminal 50, for example. These may include: copy totals since a specified date; copy totals since last bill; number of faults of a given type since a specific date; date of last billing point; current usage or fees of user; a user's online account balance; available quantities remaining on user's token, card, etc.; any other information available in the device; or any other information which may be provided over the network by the backend database system.

Statistics available to the attached terminal may be accessed through a menu system, for example. Some of these may be available to only specific users (e.g. servicemen). These statistics may be gained through a real-time query of the backend database.

The multi-device compatible interface 13 is also advantageous in terms of is scalability. That is, the number of document processing devices, groups, and geographical distribution does not affect the multi-device compatible interface 13, only the backend database. As noted above, thousands (or more) of users per document processing device 11 may be supported with the user cache on each copier. Unlimited users per copier may be supported only for online copiers through a network transaction. Numerous rules (e.g., 100 rules or more) may be storable by the multi-device compatible interface 13 to support access levels and other features. Slow and expensive networks may be supported by design efficiencies, and by keeping complexity on the backend database end where possible.

A method aspect of the invention is for enabling operation of the host 12 and the document processing device 11 from among a plurality of different possible document processing devices. The method may include connecting the multi-device compatible interface 13 between the host 12 and the document processing device 11, and determining a set of signals to use with the document processing device using the multi-device compatible interface upon connection with the document processing device. The method may also include using the determined set of signals for operation of the host and document processing device thereafter. Various other method aspects of the invention will be readily apparent to those of skill in the art based upon the foregoing and will therefore not be discussed further herein.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A document processing system comprising:
   a document processing device having a given device type from among a plurality of different device types;
   a host;
   a multi-device compatible interface for enabling operation of said host and said document processing device from among the plurality of different possible document processing devices types, said multi-device compatible interface for determining a set of signals associated with the given type to use with said document processing device upon being connected therewith, and thereafter using the determined set of signals; and
   an identification (ID) detector at the document processing device cooperating with said multi-device compatible interface for detecting user IDs and enabling document processing jobs based thereon.

2. The document processing system of claim 1 further comprising an adapter for connecting said multi-compatible interface device to said document processing device, said adapter comprising an identification circuit for identifying the set of signals to be used with said document processing device upon being connected to said multi-device compatible interface.

3. The document processing system of claim 1 wherein said multi-device compatible interface determines the set of signals to use with said document processing device based upon a protocol used by said document processing device.

4. The document processing system of claim 1 wherein said multi-device compatible interface determines the set of signals to use with said document processing device based upon signal levels used by said document processing device.

5. The document processing system of claim 4 wherein said multi-device compatible interface determines the set of signals to use with said document processing device by comparing the signal levels with a plurality of signal level patterns.

6. The document processing system of claim 1 wherein said document processing device comprises a communications port, wherein said multi-device compatible interface is connected to said communications port, and wherein said multi-device compatible interface determines the set of signals to use with said document processing device based upon a configuration of said communications port.

7. The document processing system of claim 1 wherein said multi-device compatible interface compares at least one signal generated by said document processing device with at least one threshold to detect a fault condition of said document processing device based thereon.

8. The document processing system of claim 1 further comprising a personal area network (PAN) device for collecting the job accounting data from said multi-device compatible interface.

9. The document processing system of claim 1 wherein said multi-device communication interface generates simple network management protocol (SNMP) data for said host.

10. The document processing system of claim 1 wherein said multi-device compatible interface comprises a wired network port and a wireless network port for communications with said host; and wherein said multi-device compatible interface determines which of said wired and wireless network ports is available for communicating with said host and uses said available port thereafter.

11. The document processing system of claim 1 wherein said document processing device performs at least one of printing and copying.

12. The document processing system of claim 1 wherein said multi-device compatible interface logs a respective time of processing, number of pages processed, and at least one job attribute associated with each job performed by said document processing device.

13. The document processing system of claim 12 wherein the at least one job attribute comprises at least one of page sorting, paper size, stapling, binding, double-sided processing, and color processing.

14. A multi-device compatible interface for enabling operation of a host and a document processing device having a given device type from among a plurality of different device types, the multi-device compatible interface comprising:
an interface connector to be connected to the document processing device; and
a microprocessor connected to said interface connector for determining a set of signals associated with the given device type to use with said document processing device upon being connected therewith, and thereafter using the determined set of signals;
wherein said microprocessor determines the set of signals to use with said document processing device based upon a comparison of signal levels used by said document processing device with a plurality of signal level patterns.

15. The multi-device compatible interface of claim 14 wherein said microprocessor generates simple network management protocol (SNMP) data for the host.

16. The multi-device compatible interface of claim 14 further comprising a wired network port and a wireless network port both connected to said microprocessor and for communications with said host; and wherein said microprocessor determines which of said wired and wireless network ports is available for communicating with said host and uses said available port thereafter.

17. The multi-device compatible interface of claim 14 wherein said microprocessor logs a respective time of processing, number of pages processed, and at least one job attribute associated with each job performed by the document processing device.

18. The multi-device compatible interface of claim 17 wherein the at least one job attribute comprises at least one of page sorting, paper size, stapling, binding, double-sided processing, and color processing.

19. A method for enabling operation of a host and a document processing device having a given device type from among a plurality of different device types and comprising:
connecting a multi-device compatible interface between the host and the document processing device;
determining a set of signals associated with the given device type to use with the document processing device using the multi-device compatible interface upon connection with the document processing device;
using the determined set of signals for operation of the host and document processing device thereafter; and
using an identification (ID) detector at the document processing device in cooperation with said multi-device compatible interface for detecting user IDs and enabling document processing jobs based thereon.

20. The method of claim 19 wherein connecting comprises connecting the multi-compatible interface device to the document processing device with an adapter comprising an identification circuit; and wherein determining comprises identifying the set of signals to be used with the document processing device based upon the identification circuit.

21. The method of claim 19 wherein determining comprises determining the set of signals to use with the document processing device based upon a protocol used by the document processing device.

22. The method of claim 19 wherein determining comprises determining the set of signals to use with the document processing device based upon signal levels used by the document processing device.

23. The method of claim 22 wherein the determining comprises determining the set of signals to use with the document processing device by comparing the signal levels with a plurality of signal level patterns.

24. The method of claim 19 wherein the document processing device comprises a communications port; wherein connecting comprises connecting the multi-device compatible interface to the communications port; and wherein determining comprises determining the set of signals to use with the document processing device based upon a configuration of the communications port.

25. The method of claim 19 further comprising using the multi-device compatible interface to compare at least one signal generated by the document processing device with at least one threshold to detect a fault condition of the document processing device based thereon.

26. The method of claim 19 further comprising using a personal area network (PAN) device for collecting the job accounting data from the multi-device compatible interface.

27. The method of claim 19 further comprising using the multi-device communication interface to generate simple network management protocol (SNMP) data for the host.

28. The method of claim 19 wherein the multi-device compatible interface comprises a wired network port and a wireless network port for communications with the host; and wherein the multi-device compatible interface determines which of the wired and wireless network ports is available for communicating with the host and uses the available port thereafter.

29. The method of claim 19 further comprising using the multi-device compatible interface to log a respective time of processing, number of pages processed, and at least one job attribute associated with each job performed by the document processing device.

30. The method of claim 29 wherein the at least one job attribute comprises at least one of page sorting, paper size, stapling, binding, double-sided processing, and color processing.

31. A method for enabling operation of a host and a document processing device having a given device type from among a plurality of different device types and comprising:

connecting a multi-device compatible interface between the host and the document processing device;

determining a set of signals associated with the given device type to use with the document processing device using the multi-device compatible interface upon connection with the document processing device based upon a comparison of signal levels used by said document processing device with a plurality of signal level patterns; and using the determined set of signals for operation of the host and document processing device thereafter.

32. The method of claim 31 further comprising using the multi-device compatible interface to log a respective time of processing, number of pages processed, and at least one job attribute associated with each job performed by the document processing device.

33. The method of claim 32 wherein the at least one job attribute comprises at least one of page sorting, paper size, stapling, binding, double-sided processing, and color processing.

34. The method of claim 31 further comprising using a personal area network (PAN) device for collecting the job accounting data from the multi-device compatible interface.

35. The method of claim 31 further comprising using the multi-device communication interface to generate simple network management protocol (SNMP) data for the host.

* * * * *

UNITED STATES PATENT AND TRADEMARK OFFICE
CERTIFICATE OF CORRECTION

PATENT NO. : 7,366,799 B2  Page 1 of 4
APPLICATION NO. : 10/383152
DATED : April 29, 2008
INVENTOR(S) : Reddy et al.

It is certified that error appears in the above-identified patent and that said Letters Patent is hereby corrected as shown below:

On the title page delete old existing drawing and insert the new drawing on the title page that is attached.

In the Drawings Sheet:     Delete: FIG. 1
                          Insert: New FIG. 1

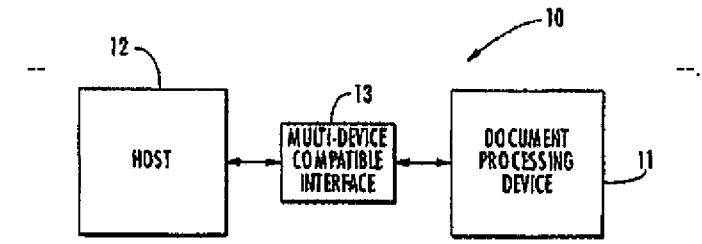

FIGURE 1

In the Drawings Sheet:     Delete: FIG. 2
                          Insert: New FIG. 2

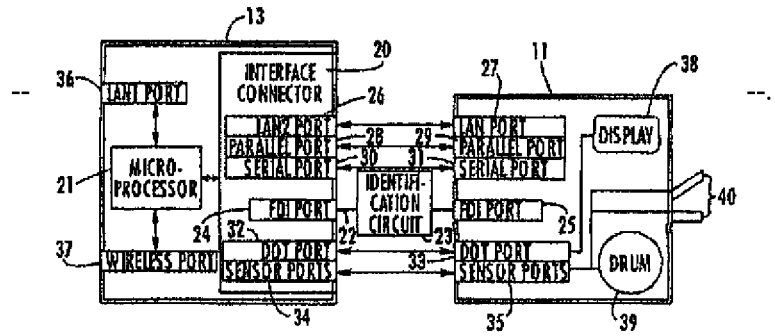

FIGURE 2

UNITED STATES PATENT AND TRADEMARK OFFICE
CERTIFICATE OF CORRECTION

PATENT NO.       : 7,366,799 B2
APPLICATION NO.  : 10/383152
DATED            : April 29, 2008
INVENTOR(S)      : Reddy et al.

It is certified that error appears in the above-identified patent and that said Letters Patent is hereby corrected as shown below:

In the Drawings Sheet:       Delete: FIG. 3
                             Insert: New FIG. 3

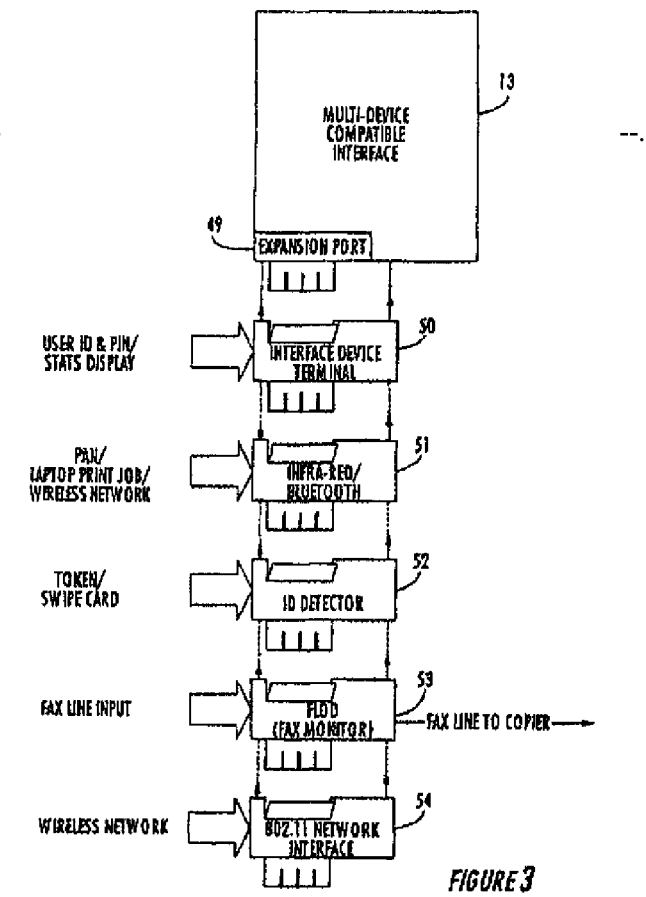

UNITED STATES PATENT AND TRADEMARK OFFICE
CERTIFICATE OF CORRECTION

PATENT NO. : 7,366,799 B2
APPLICATION NO. : 10/383152
DATED : April 29, 2008
INVENTOR(S) : Reddy et al.

It is certified that error appears in the above-identified patent and that said Letters Patent is hereby corrected as shown below:

Column 3, Line 41:   Delete: "example"
                     Insert: --example.--.

Signed and Sealed this

Ninth Day of June, 2009

JOHN DOLL
*Acting Director of the United States Patent and Trademark Office*

United States Patent
Reddy et al.

(12) 
(10) Patent No.: US 7,366,799 B2
(45) Date of Patent: Apr. 29, 2008

(54) DOCUMENT PROCESSING SYSTEM INCLUDING MULTI-DEVICE COMPATIBLE INTERFACE AND RELATED METHODS

(75) Inventors: Paul James Reddy, Auckland (NZ); Berwyn Hoyt, Auckland (NZ); Geoff Shaw, Webster, NY (US); Kevin Pickhardt, Pittsford, NY (US)

(73) Assignee: Pharos Systems International, Inc., Rochester, NY (US)

( * ) Notice: Subject to any disclaimer, the term of this patent is extended or adjusted under 35 U.S.C. 154(b) by 491 days.

(21) Appl. No.: 10/383,152

(22) Filed: Mar. 6, 2003

(65) Prior Publication Data
US 2003/0227643 A1 Dec. 11, 2003

Related U.S. Application Data

(60) Provisional application No. 60/362,209, filed on Mar. 6, 2002.

(51) Int. Cl.
G06F 3/00 (2006.01)
G06F 15/00 (2006.01)
G06F 15/16 (2006.01)

(52) U.S. Cl. .................. 710/11; 710/15; 710/16; 710/18; 358/1.13; 715/500; 709/227; 399/79; 399/82

(58) Field of Classification Search .......... 715/500; 358/1.13, 1.15; 710/11, 15, 16, 18; 709/227; 399/79, 82
See application file for complete search history.

(56) References Cited

U.S. PATENT DOCUMENTS

| | | | |
|---|---|---|---|
| 3,675,209 A * | 7/1972 | Trost et al. .................... 710/5 |
| 3,828,325 A | 8/1974 | Stafford et al. .......... 340/172.5 |
| 4,167,322 A | 9/1979 | Yano et al. .................. 355/3 R |
| 4,975,829 A * | 12/1990 | Clarey et al. .................. 703/24 |
| 5,084,875 A | 1/1992 | Weinberger et al. ......... 371/291 |
| 5,090,830 A | 2/1992 | Kroeger et al. .............. 400/719 |
| 5,214,772 A | 5/1993 | Weinberger et al. ........ 395/575 |

(Continued)

FOREIGN PATENT DOCUMENTS

EP 0096407 12/1983

(Continued)

OTHER PUBLICATIONS

Clark, Russell J., et al., "Protocol Discovery in Multi-Protocol Networks", Mobile Networks and Applications, Baltzer Science Publishers, vol. 2, © 1997, pp. 271-284.*

(Continued)

*Primary Examiner*—Shahid Alam
*Assistant Examiner*—Robert Stevens
(74) *Attorney, Agent, or Firm*—Allen, Dyer, Doppelt, Milbrath & Gilchrist, P.A.

(57) ABSTRACT

A document processing system may include a document processing device (e.g., a copier), a host (e.g., a computer server), and a multi-device compatible interface for enabling operation of the host and the document processing device from among a plurality of different possible document processing devices. That is, the multi-device compatible interface may determine a set of signals to use with the document processing device upon being connected therewith, and thereafter use the determined set of signals. Accordingly, the multi-device compatible interface may advantageously be used with numerous types of document processing devices despite the differences in their various protocols, connector types, etc.

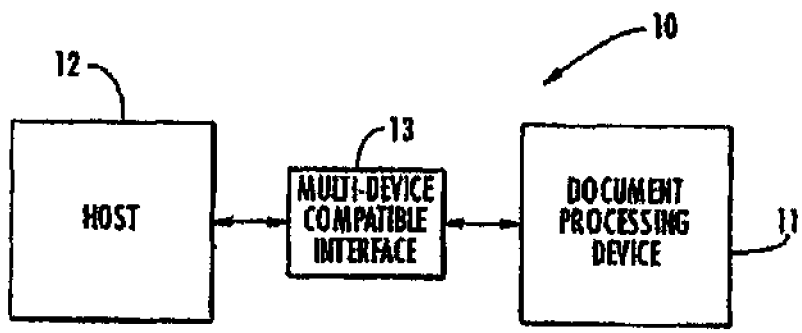

35 Claims, 2 Drawing Sheets